(No Model.) 2 Sheets—Sheet 2.
C. BROWN.
MIDDLINGS DETACHER AND GRANULATOR.
No. 268,861. Patented Dec. 12, 1882.
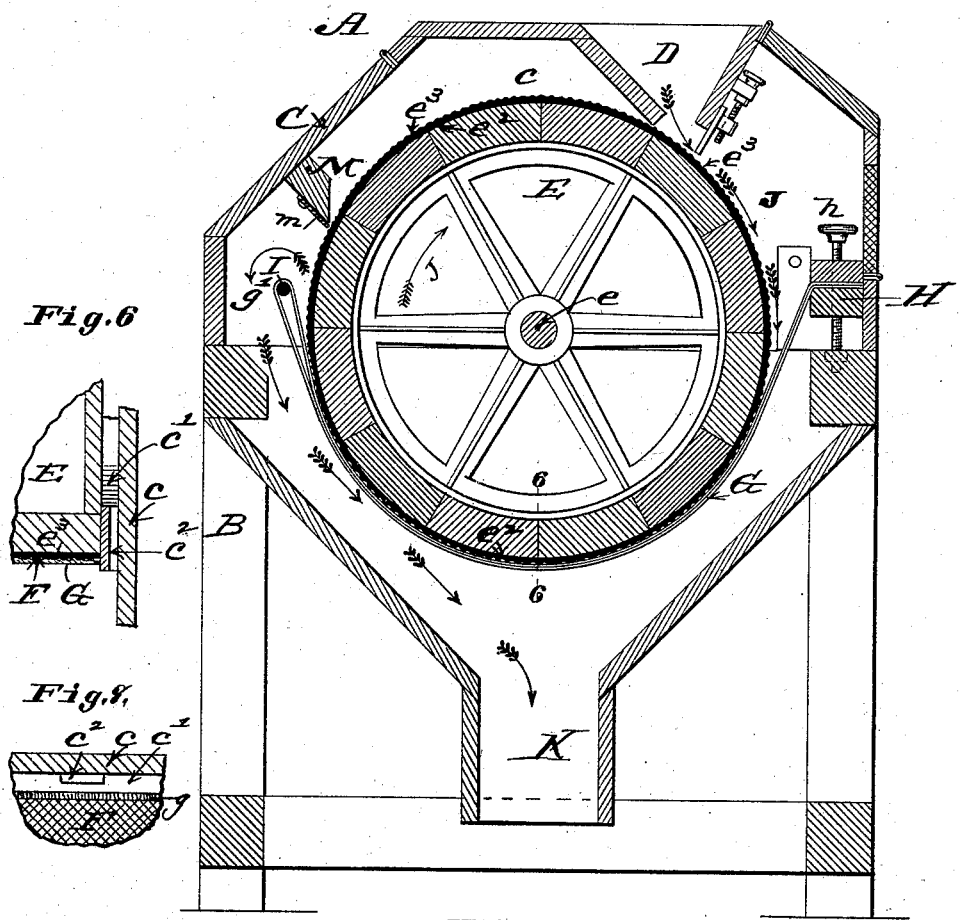
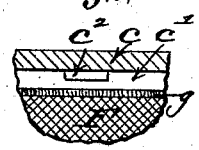
Attest:
Thos. L. Jones.
Charles Pickles
Inventor:
Charles Brown
By C. D. Moody
atty

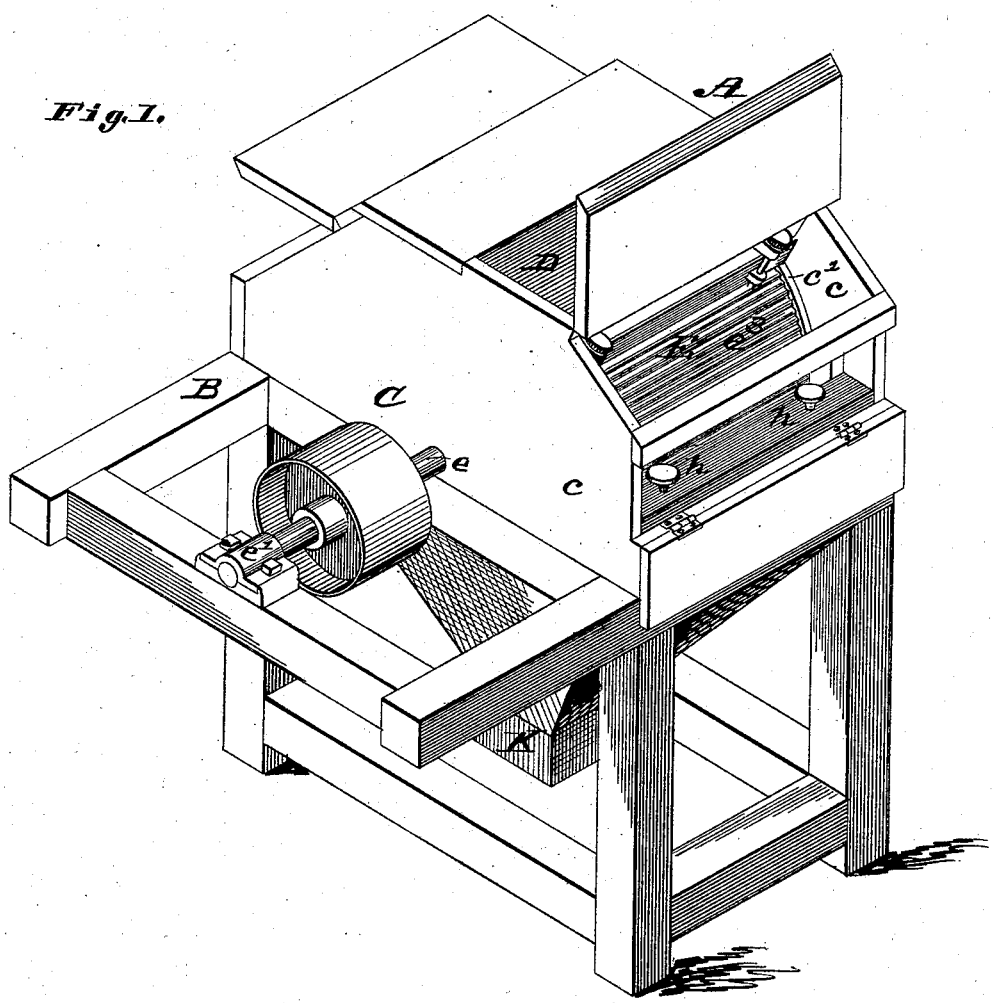

UNITED STATES PATENT OFFICE.

CHARLES BROWN, OF ST. LOUIS, MISSOURI.

MIDDLINGS DETACHER AND GRANULATOR.

SPECIFICATION forming part of Letters Patent No. 268,861, dated December 12, 1882.

Application filed August 18, 1882. (No model.)

*To all whom it may concern:*

Be it known that I, CHARLES BROWN, of St. Louis, Missouri, have made a new and useful Improvement in Middlings Detachers and Granulators, of which the following is a full, clear, and exact description, reference being had to the annexed drawings, making part of this specification, in which—

Figure 1 is a view in perspective of the improved machine, the lids being opened; Fig. 2, a vertical section; and Figs. 3, 4, 5, 6 and 7, details, Fig. 3 being a plan of a portion of the concave, and showing the adjacent casing-walls; Fig. 4, an edge elevation of the concave; Fig. 5, a plan view upon an enlarged scale, showing the concave-fringe; and Figs. 6 and 7, sectional views, showing the connection of the concave and casing, Fig. 6 being taken on the line 6 6 of Fig. 2.

The same letters denote the same parts.

I have heretofore—May 30, 1882—obtained Letters Patent for an improvement in middlings-detachers, wherein a cylinder wrapped with wire-gauze is employed in conjunction with a flexible concave. The present construction is a modification of the one referred to, the object of the modification being to provide for detaching middlings of an exceptionally tough nature.

A represents the modified detacher. The frame B, the casing C, and the hopper D are substantially as in the original construction.

E represents the cylinder attached to the shaft $e$, turning in the bearings $e'$. The cylinder-surface $e^2$ is not wrapped with wire-gauze, as in the original construction. The surface $e^2$, however, is preferably slightly roughened, and the roughening in question is conveniently produced by covering the cylinder with corrugated rubber $e^3$.

G represents the concave. It is flexible, made preferably of cloth like duck, and upheld by means of the supports H I, and made vertically-adjustable by means of the screws $h\ h$, all substantially as in the original construction, saving in this: the upper surface of the concave is provided with wire-gauze F. The concave is preferably slightly wider than the gauze, and its edges $g\ g$ are frayed out, substantially as shown in Figs. 3 and 5. The object is to provide means for packing the joints between the edges of the concave and the casing-walls $c\ c$. The frayed edges $g\ g$ come against a ring, $c'$, Figs. 1, 3, 6 and 7, which is attached to the inner side of each of the casing-walls $c\ c$. The rings $c'$ are made detachable to enable them to be renewed from time to time. There is an opening in the rings $c'$, at the lowest part thereof, as shown at $c^2$, Figs. 6 and 7, to provide for the escape of foreign matter which may collect.

The operation of the machine is similar to that of the original machine, the crushed middlings being fed from the hopper between the cylinder-surface and the wire-gauze upon the concave. The cylinder is rotated in the direction of the arrow J, Fig. 2. By reason of the gauze being upon the concave, in place of being upon the cylinder, the middlings are subjected for a longer time to a rubbing treatment, and thereby tougher middlings can be thoroughly detached. The construction is also more durable. The middlings are discharged from the farther end, $g'$, of the concave, to be delivered into the spout K.

The guard M is provided with a leather, $m$, to prevent the middlings from being carried too far upward.

I claim—

1. The combination of the walls $c\ c$, the rings $c'$, and the concave G, having the frayed edges $g\ g$, as and for the purpose described.

2. The combination of the concave G, the walls $c\ c$, and the rings $c'\ c'$, having the openings $c^2\ c^2$, as and for the purpose described.

3. In a middlings-detacher, the combination of the cylinder E, the flexible wire-gauze F, and means whereby said wire-gauze is upheld against the cylinder-surface, for the purpose described.

4. The combination of the cylinder E, having the roughened surface $E^3$, and the concave G, having the flexible wire-gauze F, substantially as described.

CHARLES BROWN.

Witnesses:
C. D. MOODY,
D. W. C. SANFORD.